US011145008B2

(12) United States Patent
Murr et al.

(10) Patent No.: US 11,145,008 B2
(45) Date of Patent: *Oct. 12, 2021

(54) SYSTEM AND METHOD FOR PREDICTING CROP YIELD

(71) Applicant: OmniEarth, Inc., Arlington, VA (US)

(72) Inventors: David Murr, Minneapolis, MN (US); Shadrian Strong, Bellevue, WA (US); Kristin Lavigne, Lincoln, MA (US); Lars P Dyrud, Crownsville, MD (US); Jonathan T Fentzke, Arlington, VA (US)

(73) Assignee: OmniEarth, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,087

(22) Filed: Jun. 12, 2020

(65) Prior Publication Data
US 2020/0380617 A1 Dec. 3, 2020

Related U.S. Application Data

(63) Continuation of application No. 14/846,747, filed on Sep. 5, 2015, now Pat. No. 10,685,408.
(Continued)

(51) Int. Cl.
*G06F 11/30* (2006.01)
*G06Q 50/02* (2012.01)
(Continued)

(52) U.S. Cl.
CPC ........... *G06Q 50/02* (2013.01); *A01B 79/005* (2013.01); *A01G 15/00* (2013.01); *G01W 1/10* (2013.01);
(Continued)

(58) Field of Classification Search
CPC ...................................... G06Q 50/20
See application file for complete search history.

(56) References Cited

U.S. PATENT DOCUMENTS 5,053,778 A 10/1991 Imhoff
5,323,317 A 6/1994 Hampton et al.
(Continued)

OTHER PUBLICATIONS

Bruzzone et al., "Detection of land-cover transitions by combining multidate classifiers", Science Direct—Pattern Recognition Letters, vol. 25, Issue 13, pp. 1491-1500, Year: 2004.
(Continued)

*Primary Examiner* — Phuong Huynh
(74) *Attorney, Agent, or Firm* — Dunlap Codding, P.C.

(57) ABSTRACT

A device includes an image data receiving component, a vegetation index generation component, a crop data receiving component, a masking component and a multivariate regression component. The image data receiving component receives image data of a geographic region. The vegetation index generation component generates an array of vegetation indices based on the received image data, and includes a plurality of vegetation index generating components, each operable to generate a respective individual vegetation index based on the received image data. The crop data receiving component receives crop data associated with the geographic region. The masking component generates a masked vegetation index based on the array of vegetation indices and the received crop data. The multivariate regression component generates a crop parameter based on the masked vegetation index.

14 Claims, 16 Drawing Sheets

Related U.S. Application Data

(60) Provisional application No. 62/139,379, filed on Mar. 27, 2015.

(51) Int. Cl.

| | | |
|---|---|---|
| *G06T 7/00* | (2017.01) | |
| *G01W 1/10* | (2006.01) | |
| *G06N 5/02* | (2006.01) | |
| *G06F 16/29* | (2019.01) | |
| *G06F 16/583* | (2019.01) | |
| *A01G 15/00* | (2006.01) | |
| *G06K 9/00* | (2006.01) | |
| *A01B 79/00* | (2006.01) | |
| *G06N 20/00* | (2019.01) | |

(52) U.S. Cl.
CPC ............ *G06F 16/29* (2019.01); *G06F 16/583* (2019.01); *G06K 9/00657* (2013.01); *G06N 5/022* (2013.01); *G06T 7/0004* (2013.01); *G06N 20/00* (2019.01); *G06T 2207/10036* (2013.01); *G06T 2207/30188* (2013.01)

(56) References Cited

U.S. PATENT DOCUMENTS

| | | |
|---|---|---|
| 7,058,197 B1 | 6/2006 | McGuire et al. |
| 7,386,170 B2 | 6/2008 | Ronk et al. |
| 7,647,181 B2 | 1/2010 | Vaatveit |
| 8,001,115 B2 | 8/2011 | Davis et al. |
| 8,243,997 B2 | 8/2012 | Davis et al. |
| 8,250,481 B2 | 8/2012 | Klaric et al. |
| 8,655,601 B1 | 2/2014 | Sridhar et al. |
| 9,141,872 B2 | 9/2015 | Marchisio et al. |
| 9,147,132 B2 | 9/2015 | Marchisio et al. |
| 9,202,252 B1 | 12/2015 | Smith |
| 9,418,290 B2 | 8/2016 | Lavigne et al. |
| 9,875,430 B1 | 1/2018 | Keisler et al. |
| 10,685,408 B2* | 6/2020 | Murr .................. A01B 79/005 |
| 2007/0030998 A1 | 2/2007 | O'Hara |
| 2007/0112695 A1 | 5/2007 | Wang et al. |
| 2007/0116365 A1* | 5/2007 | Kloer .................... G06T 7/136 |
| | | 382/190 |
| 2009/0271045 A1 | 10/2009 | Savelle et al. |
| 2010/0223276 A1 | 9/2010 | Al-Shameri et al. |
| 2015/0027040 A1 | 1/2015 | Redden |
| 2015/0071528 A1 | 3/2015 | Marchisio et al. |
| 2015/0294154 A1 | 10/2015 | Sant et al. |
| 2015/0371115 A1 | 12/2015 | Marchisio et al. |
| 2016/0088807 A1 | 3/2016 | Bermudez Rodriguez et al. |
| 2016/0239709 A1* | 8/2016 | Shriver ............. G06K 9/00657 |
| 2016/0253595 A1 | 9/2016 | Mathur et al. |

OTHER PUBLICATIONS

Marceau et al., "Evaluation of the Grey-Level Co-Occurrence Matrix Method for Land-Cover Classification Using SPOT Imagery", IEEE—Transactions on Geoscience and Remote Sensing, vol. 28, No. 4, pp. 513-519, Year: 1990.

USPTO, Office Action regarding U.S. Appl. No. 15/998,604, dated May 13, 2019.

* cited by examiner

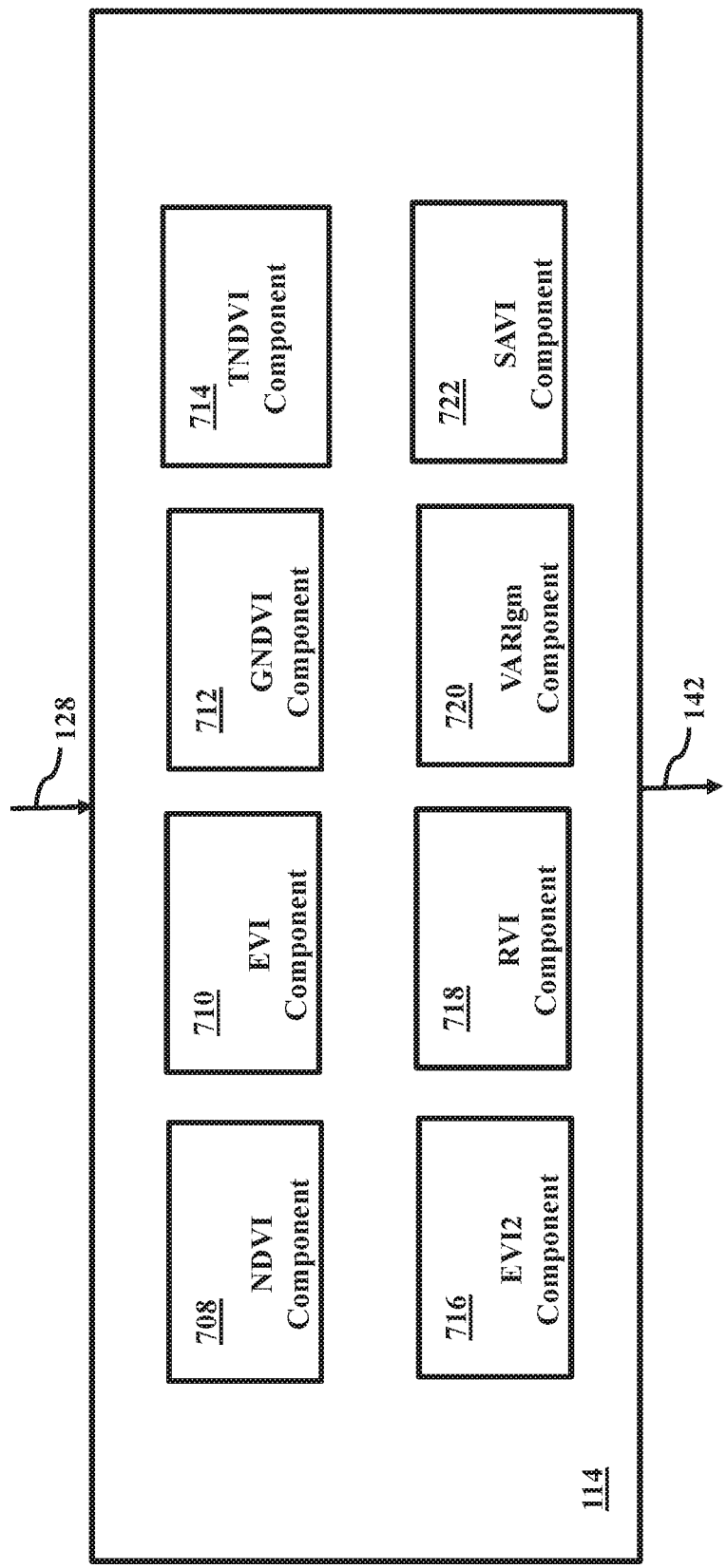

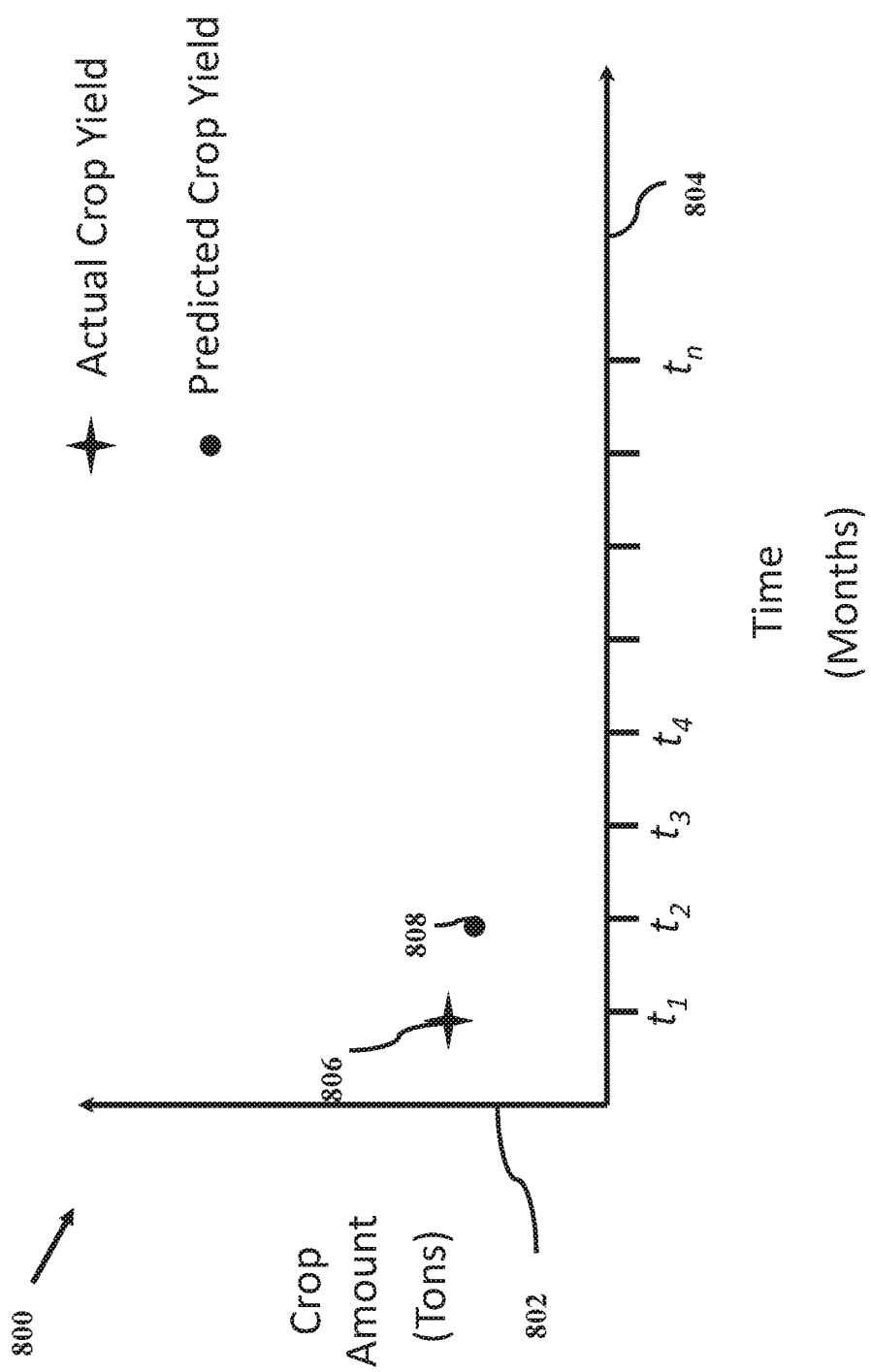

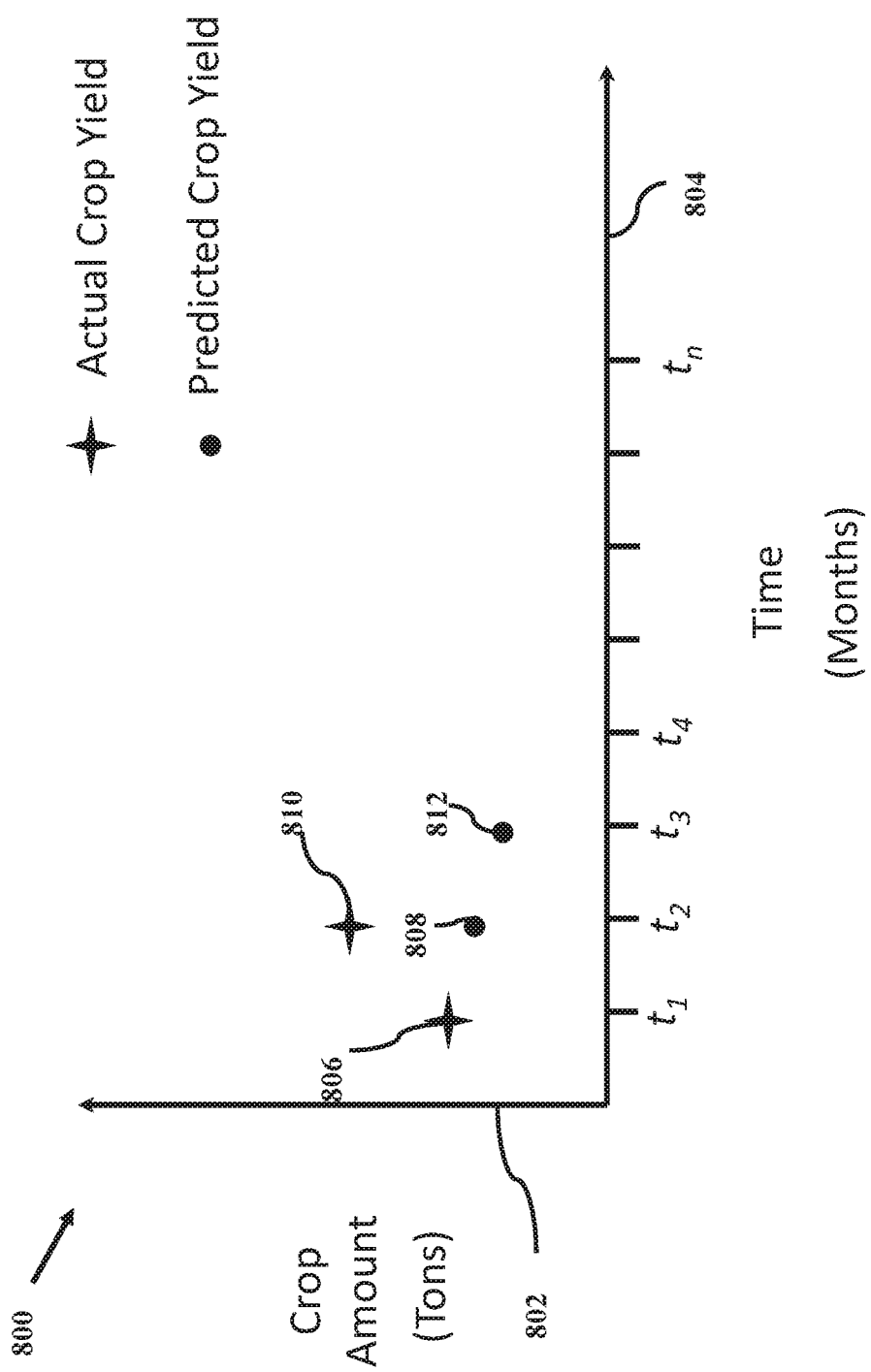

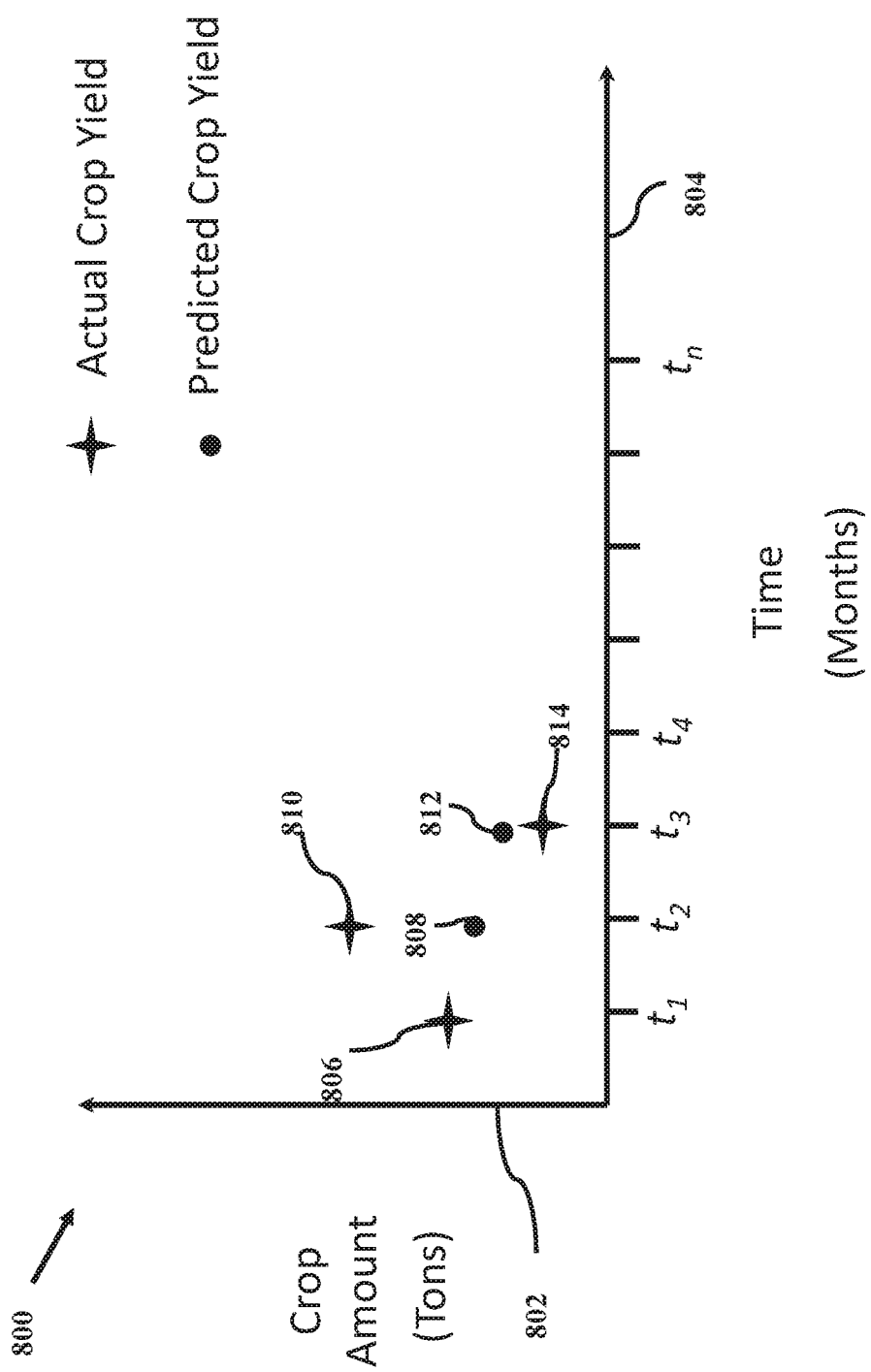

SYSTEM AND METHOD FOR PREDICTING CROP YIELD

CROSS-REFERENCE TO RELATED APPLICATIONS

The present application claims priority from and is a continuation of U.S. Ser. No. 14/846,747, filed Sep. 5, 2015 which claim priority to U.S. Provisional Application No. 62/139,379 filed Mar. 27, 2015, the entire contents of each of which are incorporated herein by reference.

BACKGROUND

The present invention generally deals with systems and method of predicting crop yield.

There exists a need to provide an improved system and method of predicting crop yield.

SUMMARY

The present invention provides an improved method and apparatus of predicting crop yield.

Various embodiments described herein are drawn to a device that includes an image data receiving component, a vegetation index generation component, a crop data receiving component, a masking component and a multivariate regression component. The image data receiving component receives image data of a geographic region. The vegetation index generation component generates an array of vegetation indices based on the received image data, and includes a plurality of vegetation index generating components, each operable to generate a respective individual vegetation index based on the received image data. The crop data receiving component receives crop data associated with the geographic region. The masking component generates a masked vegetation index based on the array of vegetation indices and the received crop data. The multivariate regression component generates a crop parameter based on the masked vegetation index.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 7 illustrates an example of the vegetation index generation component of FIG. 1, in accordance with aspects of the present invention;

FIG. 8A illustrates a graph of actual crop yield versus predicted crop yield;

FIG. 8B illustrates a graph of actual crop yield versus predicted crop yield;

FIG. 8C illustrates a graph of actual crop yield versus predicted crop yield;

DETAILED DESCRIPTION

Aspects of the present invention are drawn to a system and method for predicting crops.

Satellite imagery is conventionally used to determine many parameters. In accordance with aspects of the present invention, satellite imagery is used to predict crop yield.

A system and method for predicting crop yield will now be described with reference to FIGS. 1-13.

Figure 1:
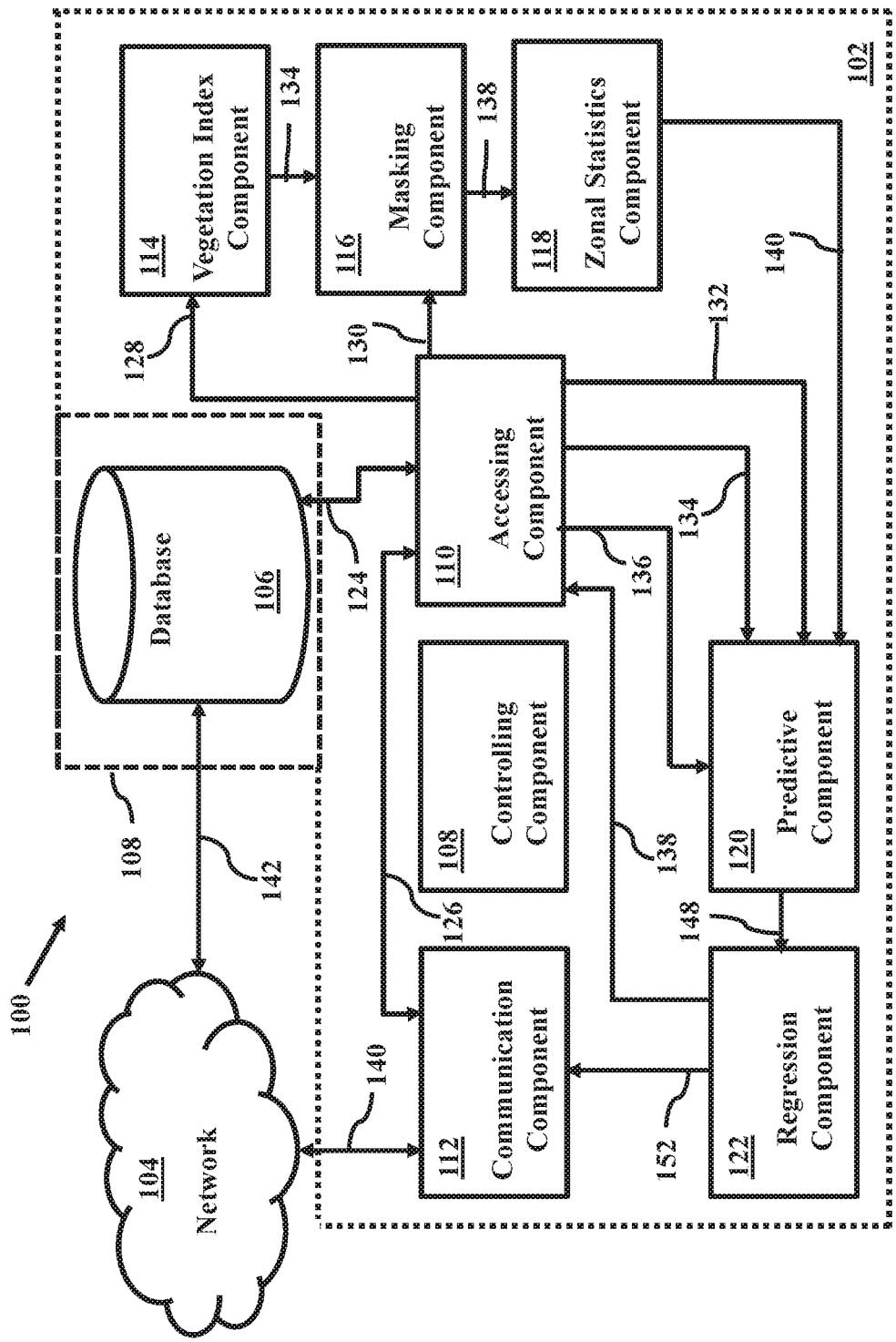
FIG. 1 illustrates a system for predicting crop yield in accordance with aspects of the present invention.

FIG. 1 illustrates a system 100 for predicting crop yield in accordance with aspects of the present invention.

As shown in the figure, system 100 includes crop yield managing component 102 and a network 104. Crop yield managing component 102 includes a database 106, a controlling component 108, an accessing component 110, a communication component 112, a vegetation index generation component 114, a masking component 116, a zonal statistics component 118, a regression component 122 and a predictive component 120.

In this example, database 106, controlling component 108, accessing component 110, communication component 112, vegetation index generation component 114, masking component 116, zonal statistics component 118, regression component 122 and predictive component 120 are illustrated as individual devices. However, in some embodiments, at least two of database 106, controlling component 108, accessing component 110, communication component 112, vegetation index generation component 114, masking component 116, zonal statistics component 118, regression component 122 and predictive component 120 may be combined as a unitary device. Further, in some embodiments, at least one of database 106, controlling component 108, accessing component 110, communication component 112, vegetation index generation component 114, masking component 116, zonal statistics component 118, regression component 122 and predictive component 120 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controlling component 108 is in communication with each of accessing component 110, communication component 112, vegetation index generation component 114, masking component 116, zonal statistics component 118, regression component 122 and predictive component 120 by communication channels (not shown). Controlling component 108 may be any device or system that is able to control operation of each of accessing component 110, communication component 112, vegetation index generation component 114, masking component 116, zonal statistics component 118, regression component 122 and predictive component 120.

Accessing component 110 is arranged to bi-directionally communicate with database 106 via a communication channel 124 and is arranged to bi-directionally communicate with communication component 112 via a communication channel 126. Accessing component 110 is additionally arranged to communicate with vegetation index generation component 114 via a communication channel 128, to communicate with masking component 116 via a communication channel 130, to communicate with regression component 122 via communication channels 132, 134 and 136, and to communicate with predictive component 120 via a communication channel 138. Accessing component 110 may be any device or system that is able to access data within database 106 directly via communication channel 124 or indirectly, via communication channel 126, communication component 112, a communication channel 140, network 104 and communication channel 142.

Communication component 112 is additionally arranged to bi-directionally communicate with network 104 via communication channel 140. Communication component 112 may be any device or system that is able to bi-directionally communicate with network 104 via communication channel 140.

Network 104 is additionally arranged to bi-directionally communicate with database 106 via a communication channel 142. Network 104 may be any of known various communication networks, non-limiting examples of which include a Local Area Network (LAN), a Wide Area Network (WAN), a wireless network and combinations thereof. Such networks may support telephony services for a mobile terminal to communicate over a telephony network (e.g., Public Switched Telephone Network (PSTN). Non-limiting example wireless networks include a radio network that supports a number of wireless terminals, which may be fixed or mobile, using various radio access technologies. According to some example embodiments, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth™, ultra-wideband (UWB), the IEEE 802.22 standard, etc.

Vegetation index generation component 114 is additionally arranged to communicate with masking component 116 via a communication channel 144. Vegetation index generation component 114 may be any device or system that is able to generate a vegetation index, for example a normalized difference vegetation index (NDVI). A vegetation index is a simple graphical indicator that can be used to analyze remote sensing measurements, typically not necessarily form a space platform, and assess whether the target being observed contains live green vegetation or not. In an example embodiment, a vegetation index, in this case NDVI, is generated using the following equation:

$$(v_{NIR}-v_R)/(v_{NIR}+v_R), \tag{1}$$

where $v_{NIR}$ is the near infrared band and where $v_R$ is the red band.

Masking component 116 is additionally arranged to communicate with zonal statistics component 118 via a communication channel 146. Masking component 116 may be any device or system that is able to isolate or identify subregions within the larger image area for enabling performance of discrete calculations or analysis. Zonal statistics component 118 is additionally arranged to communicate with regression component 122 via a communication channel 148. Zonal statistics component 118 may be any device or system that is able to delineate data in a zonal basis. For example, zonal statistics component 118 may provide data based on country boundaries, state boundaries, county boundaries, city boundaries, town boundaries, land plot boundaries, etc.

Regression component 122 is additionally arranged to communicate with predictive component 120 via a communication channel 150. Regression component 122 may be any device or system that is able to modify weighting factors to generate curve fitting functions that model historical actual crop yield and that predict future crop yield.

Predictive component 120 is additionally arranged to communicate with communication component 112 via a communication channel 150. Predictive component 120 may be any device or system that is able to predict a future crop yield based on historical crop data.

Communication channels 124, 126, 128, 130, 132, 134, 136, 138, 140, 142, 144, 146, 148, 150 and 152 may be any known wired or wireless communication channel.

Operation of system 100 will now be described with reference to FIGS. 2-11.

Figure 2:
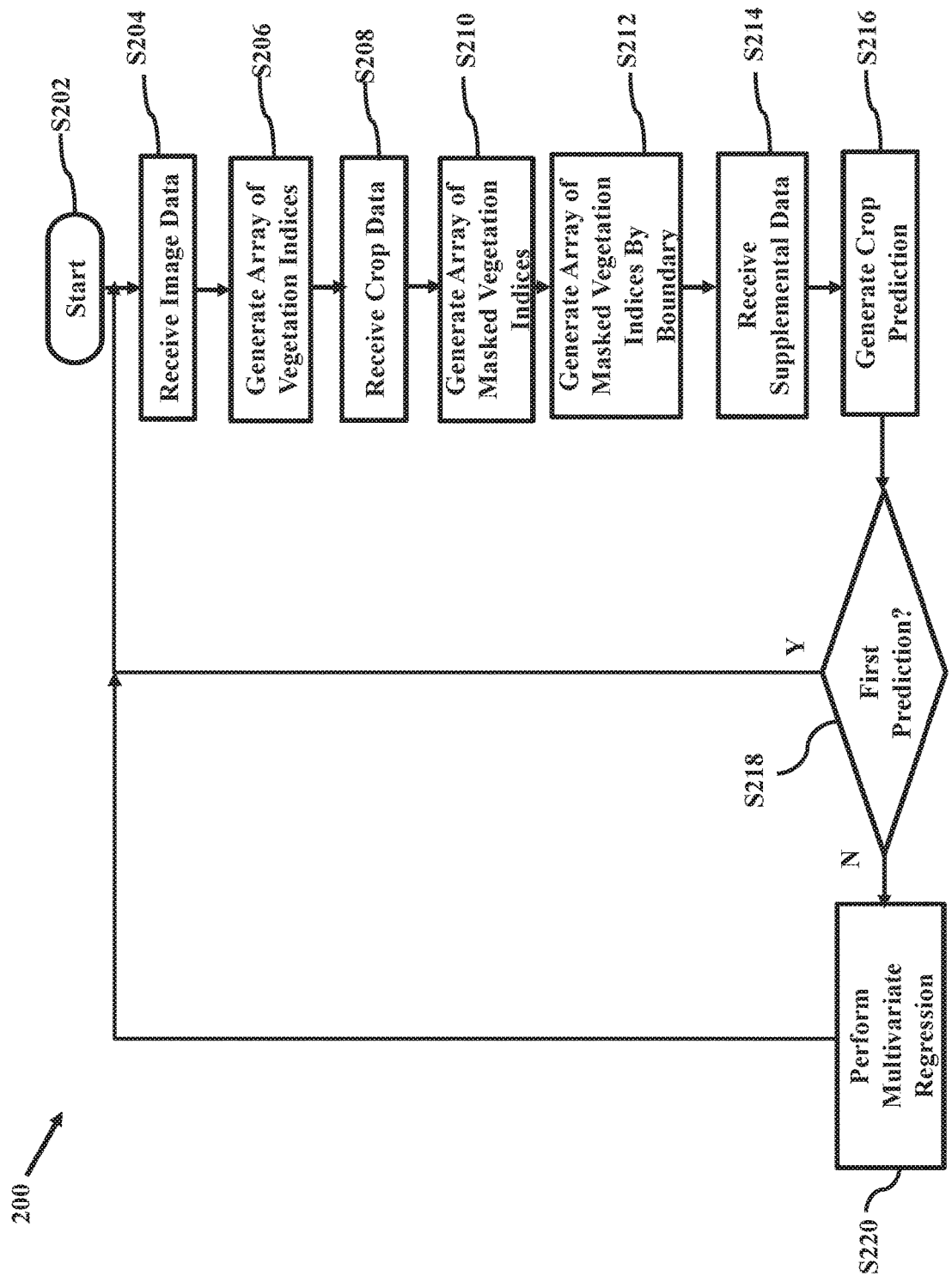
FIG. 2 illustrates a method of predicting crop yield in accordance with aspects of the present invention.

FIG. 2 illustrates a method 200 of predicting crop yield in accordance with aspects of the present invention.

As shown in the figure, method 200 starts (S202) and image data is received (S204). For example, as shown in FIG. 1, accessing component 110 retrieves image data from database 106. In some embodiments, accessing component 110 may retrieve the image data directly from database 106 via communication channel 124. In other embodiments, accessing component 110 may retrieve the image data from database 106 via a path of communication channel 126, communication component 112, communication channel 140, network 104 and communication channel 142.

Database 106 may have various types of data stored therein. This will be further described with reference to FIG. 3.

Figure 3:
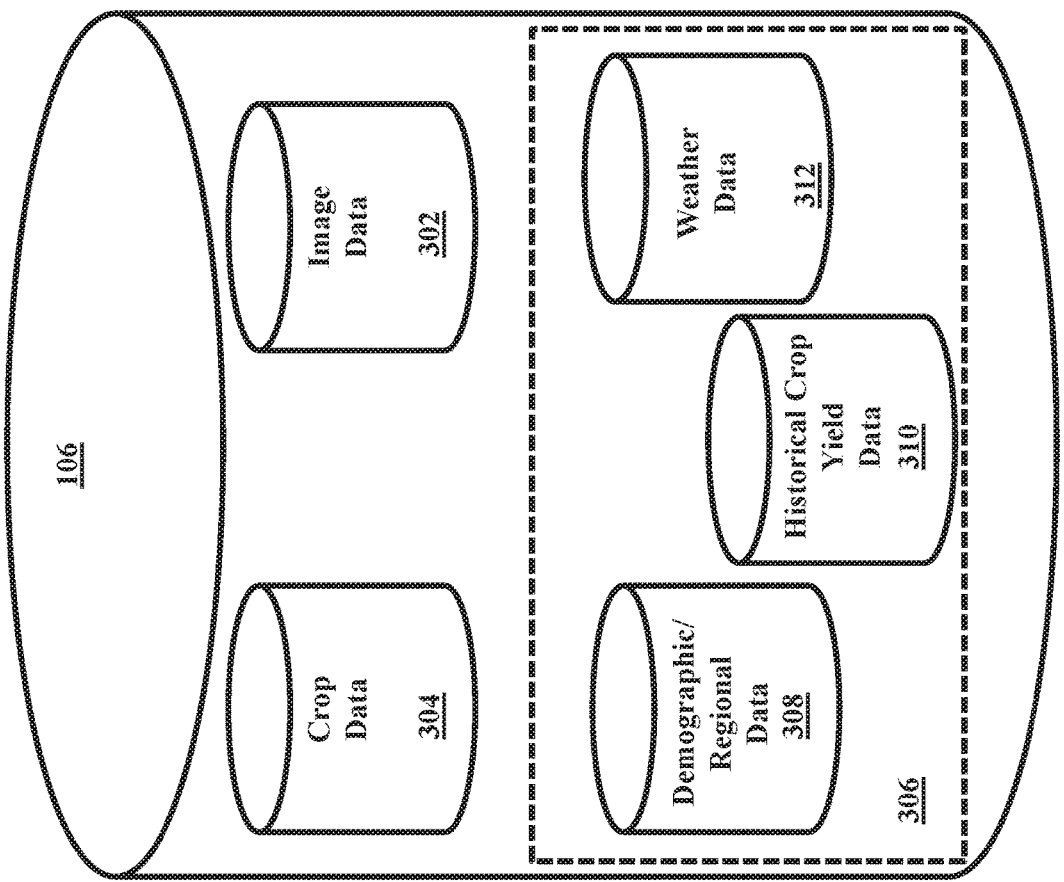
FIG. 3 illustrates an example of the database of FIG. 1.

FIG. 3 illustrates an example of database 106 of FIG. 1.

As shown in FIG. 3, database 106 includes an image data database 302, a crop data database 304 and supplemental data databases 306.

Supplemental data databases 306 may include a plurality of different databases, each storing a distinct type of data. In this example embodiment, supplemental databases 306 include a demographic/economic/regional data database 310, a historical crop yield data database 310 and a weather data database 312.

In this example, image data database 302, crop data database 304 and supplemental data database 306 are illustrated as individual devices. However, in some embodiments, at least two of image data database 302, crop data database 304 and supplemental data database 306 may be combined as a unitary device. Further, in some embodiments, at least one of image data database 302, crop data database 304 and supplemental data database 306 may be implemented as a computer having tangible computer-readable media for carrying or having computer-executable instructions or data structures stored thereon.

In this example, demographic/economic/regional data database 310, historical crop yield data database 310 and weather data database 312 are illustrated as individual devices. However, in some embodiments, at least two of demographic/economic/regional data database 310, historical crop yield data database 310 and weather data database 312 may be combined as a unitary device. Further, in some embodiments, at least one of demographic/economic/regional data database 310, historical crop yield data database 310 and weather data database 312 may be implemented as a computer having tangible computer-readable media for carrying or having computer-executable instructions or data structures stored thereon.

Image data database 302 includes image data corresponding to an area of land for which crop yield is to be estimated. The image data may be provided via a satellite imaging platform. The image data may include a single band or multi-band image data, wherein the image (of the same area of land for which crop yield is to be estimated) is imaged in a more than one frequency. In some embodiments, image data may include 4-band image data, which include red, green, blue and near infrared bands (RGB-NIR) of the same area of land for which crop yield is to be estimated. In other embodiments, the image data may include more than 4 bands, e.g., hyperspectral image data. The image data comprises pixels, each of which includes respective data values for frequency (color) and intensity (brightness). The frequency may include a plurality of frequencies, based on the number of bands used in the image data. Further, there may be a respective intensity value for each frequency value.

Crop data database 304 includes training data to train masking component 116 to distinctly classify an image pixel. For example, training data for a 4-band image may include specific 4-band pixels data values associated with each type of crop. In other words, there may be training data for a pixel associated with an image of an area of a corn crop and different training data for a pixel associated with an area of a wheat crop. Training data may be provided by government entities, e.g., the U.S. Department of Agriculture, or from the farmers of the farms themselves.

Demographic/economic/regional data database 308 includes data associated with the population of the imaged region. This may be provided by government agencies or private companies. Non-limiting examples of demographic/economic/regional data include data associated with money, education, health, etc.

Historical crop yield data database 310 includes former crop yield data of the imaged region. This may be provided by owners or managers of the land for which the crops of the imaged region are located. Non-limiting examples of crop yield data include total value of yielded crop, value of yielded crop per unit area, percentage of yielded crop per unit area, etc.

Weather data database 312 includes data associated with weather of the imaged region. This may be provided by government agencies or private companies. Non-limiting examples of weather data include past temperature data, past pressure data, past humidity/rainfall data, past evapotranspiration data, current temperature data, current pressure data, current humidity/rainfall data, current evapotranspiration data and forecast temperature data, forecast pressure data, forecast evapotranspiration data and forecast current humidity/rainfall data.

Returning to FIG. 1, in some cases, database 106 is included in crop yield managing component 102. However, in other cases, database 106 is separated from crop yield managing component 102, as indicated by dotted rectangle 108.

As accessing component 110 will be accessing many types of data from database 106, accessing component 110 includes many data managing components. This will be described with greater detail with reference to FIG. 4.

Figure 4:
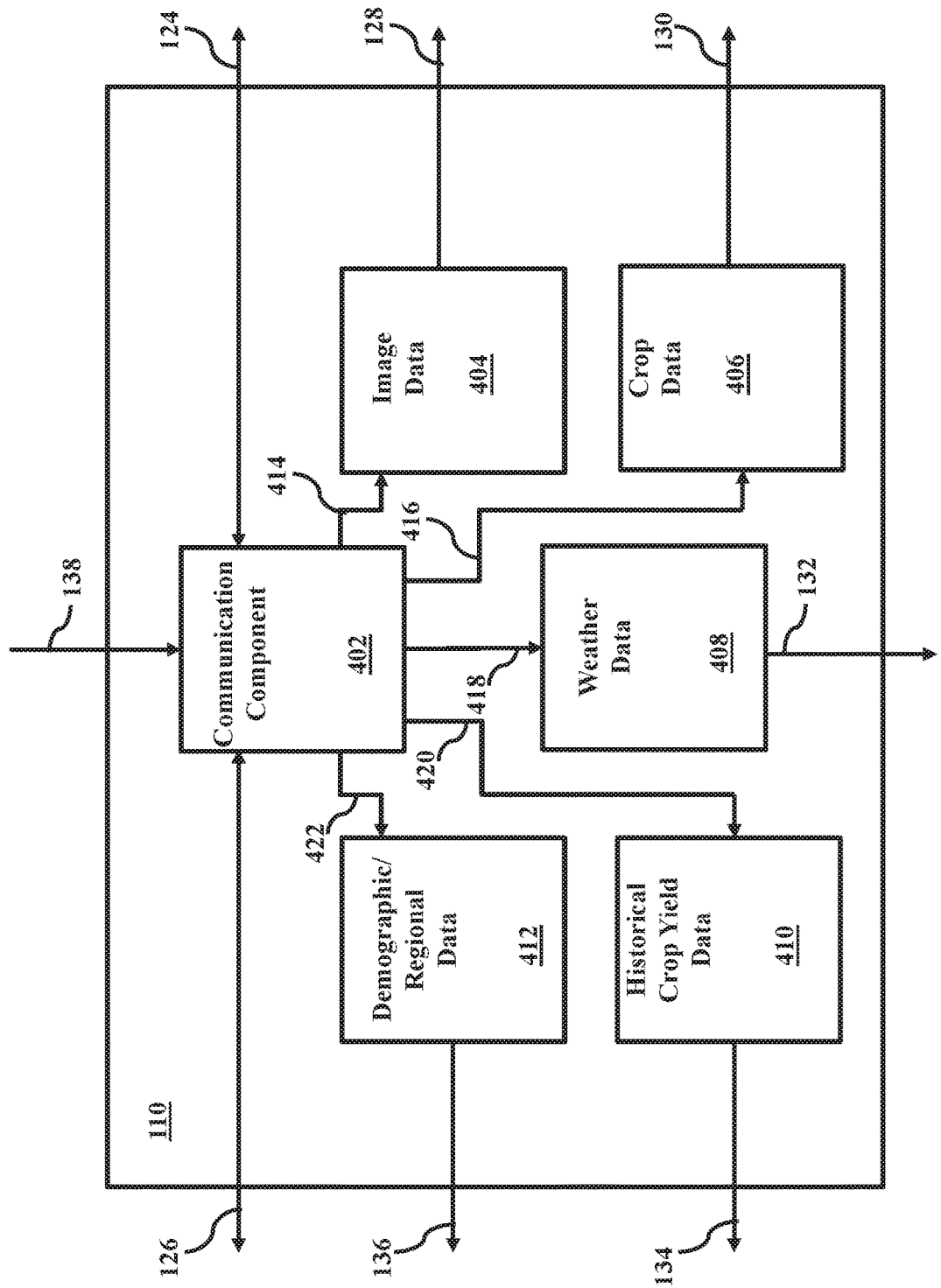
FIG. 4 illustrates an example of the accessing component of FIG. 1.

FIG. 4 illustrates an example of accessing component 110 of FIG. 1.

As shown in FIG. 4, accessing component 110 includes a communication component 402, an image data receiving component 404, a crop data receiving component 406, a weather data receiving component 408, a historical crop yield data receiving component 410 and a demographic/economic/regional data receiving component 412.

In this example, communication component 402, image data receiving component 404, crop data receiving component 406, weather data receiving component 408, historical crop yield data receiving component 410 and demographic/economic/regional data receiving component 412 are illustrated as individual devices. However, in some embodiments, at least two of communication component 402, image data receiving component 404, crop data receiving component 406, weather data receiving component 408, historical crop yield data receiving component 410 and demographic/economic/regional data receiving component 412 may be combined as a unitary device. Further, in some embodiments, at least one of communication component 402, image data receiving component 404, crop data receiving component 406, weather data receiving component 408, historical crop yield data receiving component 410 and demographic/economic/regional data receiving component 412 may be implemented as a computer having tangible computer-readable media for carrying or having computer-executable instructions or data structures stored thereon.

Communication component 402 is arranged to bi-directionally communicate with database 106 via a communication channel 124 and is arranged to bi-directionally communicate with communication component 112 via a communication channel 126. Communication component 402 is additionally arranged to communicate with image data component 404 via a communication channel 414, to communicate with crop data receiving component 406 via a communication channel 416, to communicate with weather data receiving component 408 via a communication channel 418, to communicate with historical crop yield data receiving component 410 via a communication channel 420 and to communicate with demographic/economic/regional data receiving component 412 via a communication channel 422. Communication component 402 may be any device or system that is able to access data within database 106 directly via communication channel 124 or indirectly, via communication channel 126, communication component 112, communication channel 138, network 104 and communication channel 140. Image data component 404, crop data receiving component 406, weather data receiving component 408, historical crop yield data receiving component 410 and demographic/economic/regional data receiving component 412 may each be any device or system that is able to receive data from communication component 402 and to output the received data.

Image data component 404 is additionally arranged to communicate with vegetation index generation component 114 via communication channel 128. Crop data receiving component 406 is additionally arranged to communicate with masking component 116 via communication channel 130. Weather data receiving component 408 is additionally arranged to communicate with regression component 122 via communication channel 132. Historical crop yield data receiving component 410 is additionally arranged to communicate with regression component 122 via communication channel 134. Demographic/economic/regional data receiving component 412 is additionally arranged to communicate with regression component 122 via communication channel 136. Communication channels 414, 416, 418, 420 and 422 may be any known wired or wireless communication channel.

Returning to FIG. 1, at this point accessing component 110 has received the image data. An example of such image data will now be described with reference to FIG. 5.

Figure 5:
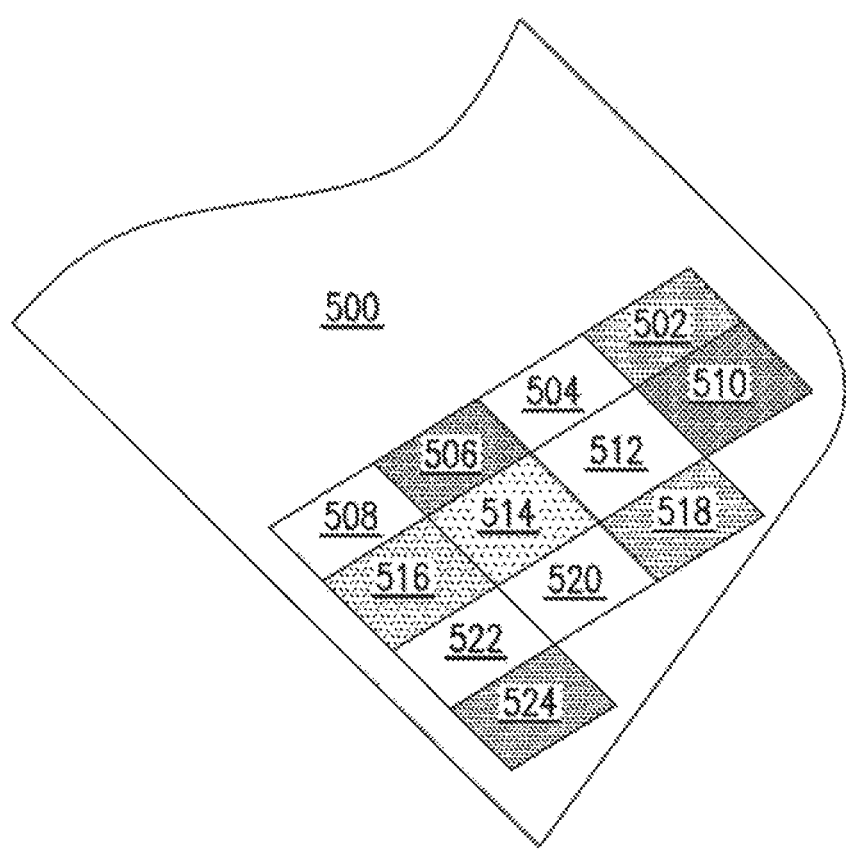
FIG. 5 illustrates a satellite image of a plot of land.

FIG. 5 illustrates a satellite image 500 of a plot of land as imaged in the RGB spectrum.

As shown in the figure, satellite image 500 includes a crop of red peppers 502 as imaged in RGB, a crop of green beans 504 as imaged in RGB, a crop of corn 506 as imaged in RGB, a crop of broccoli 508 as imaged in RGB, a crop of green beans 510 as imaged in RGB, a crop of broccoli 512 as imaged in RGB, a crop of red peppers 514 as imaged in RGB, a crop of green beans 504 as imaged in RGB, a crop of corn 518 as imaged in RGB, a crop of broccoli 520 as imaged in RGB, a crop of corn 522 as imaged in RGB and a crop of red peppers 524 as imaged in RGB.

In satellite image 500, crops of red peppers 502, 514 and 524 look alike. Similarly, crops of green beans 504, 510 and 516 look alike and crops of corn 506, 518 and 522 look alike. Clearly, with just RGB imaging, the differences between crops might not provide sufficient information for predicting crop yield. In accordance with aspects of the present invention, a multispectral imaging of the crops will help provide further information for more accurately predicting crop yield.

In some embodiments, the plot of land of satellite image 500 is imaged with multiple frequencies as discussed above. Each frequency is associated with different data. For example, in a simple sense, using RGB imaging (the visible spectrum), a dark brown red pepper may indicate that the red pepper is rotten. Along this line, by imaging the plot of land of satellite image 500 with multiple frequencies, a more accurate view of the current state of the crops—a now cast of the crops—can be developed. This will be described with additional reference to FIG. 6.

Figure 6:
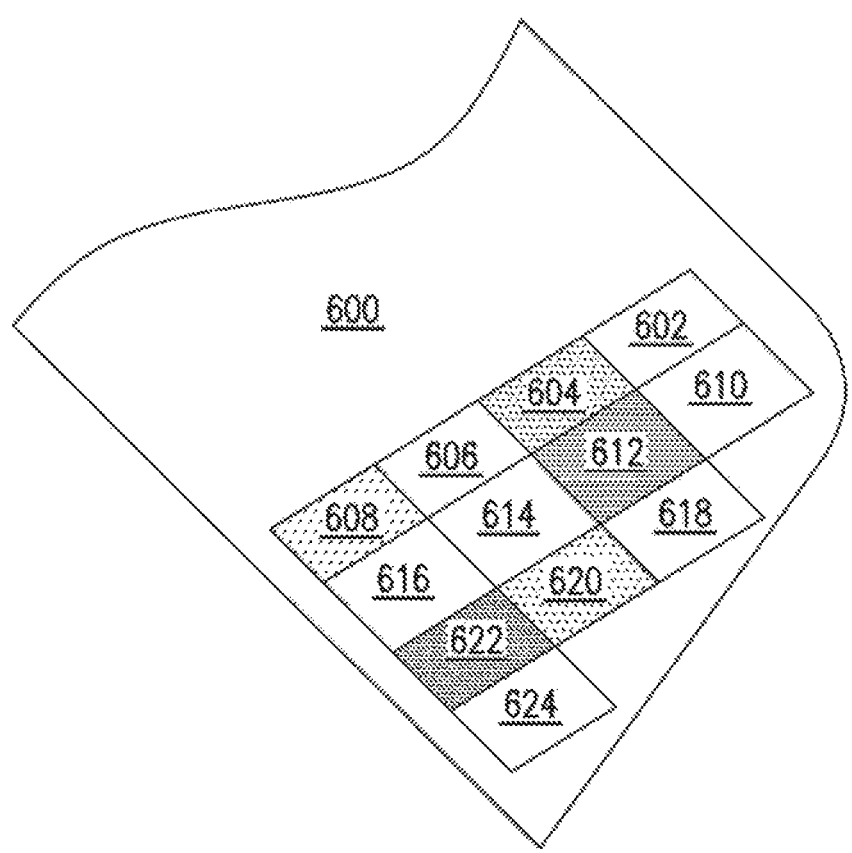
FIG. 6 illustrates a processed satellite image of a plot of land.

FIG. 6 illustrates another satellite image 600 of the plot of land of image 500, but as imaged in an infrared spectrum.

As shown in the figure, satellite image 600 includes crop of red peppers 502 as imaged in an infrared spectrum, crop of green beans 504 as imaged in an infrared spectrum, crop of corn 506 as imaged in an infrared spectrum, crop of broccoli 508 as imaged in an infrared spectrum as imaged in an infrared spectrum, crop of green beans 510 as imaged in an infrared spectrum, crop of broccoli 512 as imaged in an infrared spectrum, crop of red peppers 514 as imaged in an infrared spectrum, crop of green beans 504 as imaged in an infrared spectrum, crop of corn 518 as imaged in an infrared spectrum, crop of broccoli 520 as imaged in an infrared spectrum, crop of corn 522 as imaged in an infrared spectrum and crop of red peppers 524 as imaged in an infrared spectrum.

In satellite image 600, crops of red peppers 502, 514 and 524 have a similarity, but are distinctly different. Similarly, crops of green beans 504, 510 and 516 have a similarity, but are distinctly different and crops of corn 506, 518 and 522 have a similarity, but are distinctly different. The differences between similar crops may be for many reasons. The important issue is that the infrared imaging provides a graphical interface associated with the differences.

By associating different aspects of crops with different frequencies, and amplitudes of the different frequencies, the different aspects of the crops may be evaluated.

As for a broad view of method 200, system 100 will be able to determine the aspects of a particular crop within the area of land within satellite image 500 by way of known associations of aspects with multi-spectral images and to predict aspects of the particular crop, such as crop yield, within the area of land within satellite image 500. This will now be continued by returning to FIG. 2.

After the image data is received (S204), a vegetation index is generated (S206). For example, as shown in FIG. 1, accessing component 110 provides the received image data to vegetation index generation component 114 via communication channel 128. For example, as shown in FIG. 1 accessing component 110 retrieves image data from database 106. As shown in FIG. 3, database 106 provides the image data from image data database 302. As shown in FIG. 4, communication component 402 receives the image data from image data database 302 and provides the image data to image data receiving component 404 via communication channel 414. Returning to FIG. 1, image data receiving component 404 (of accessing component 110) then provides the image data to vegetation index generation component 114 via communication channel 128.

Vegetation index generation component 114 generates an array of vegetation indices for the image data and provides the array of vegetation indices to masking component 116 via communication channel 132. The generation of the array of vegetation indices will be described in more detail with reference to FIG. 7.

FIG. 7 illustrates an example of vegetation index generation component 114, in accordance with aspects of the present invention.

As shown in the figure, vegetation index generation component 114 includes a plurality of vegetation index generating components, each operable to generate a respective individual vegetation index based on the received image data. In this example embodiment, the plurality of vegetation index generating components include a Normalized Difference Vegetation Index (NDVI) generating component 708, an Enhance Vegetation Index (EVI) generating component 710, a Green Normalized Difference Vegetation Index (GNDVI) generating component 712, a Transformed Normalized Difference Vegetation Index (TNDVI) generating component 714, an Enhanced Vegetation Index—2 (EVI2) generating component 716, an Ratio Vegetation Index (RVI) generating component 718, a Visible Atmospheric Resistant Index (VARI) generating component 720 and a Soil Adjusted Vegetation Index (SAVI) generating component 722.

Each vegetation index generating component in vegetation index generation component 114 provides a unique vegetation index, each of which will be used to predict the aspects of the crops. As such, an array of vegetation indices is generated by vegetation index generation component 114. Each pixel of the image has data associated with a vegetation index as generated by each of the vegetation index generating component in vegetation index generation component 114.

Returning to FIG. 2, after the array of vegetation indices is generated (S206), crop data is received (S208). For example, as shown in FIG. 1, accessing component 110 provides the crop data to masking component 116 via communication channel 130. For example, as shown in FIG. 1 accessing component 110 retrieves crop data from database 106. As shown in FIG. 3, database 106 provides the crop data from crop data database 304. As shown in FIG. 4, communication component 402 receives the crop data from crop data database 304 and provides the crop data to crop data receiving component 406 via communication channel 416. Returning to FIG. 1, crop data receiving component 406 (of accessing component 110) then provides the crop data to masking component 114 via communication channel 130.

Returning to FIG. 2, after crop data is received (S208), an array of masked vegetation indices is generated (S210). For example, as shown in FIG. 1, vegetation index generation component 114 provides the array of vegetation indices to masking component 116 via communication channel 134.

Masking component 116 uses the crop data from crop data receiving component 406 and the array of vegetation indices from vegetation index generation component 114 to generate an array of masked vegetation indices. In other words, returning to FIG. 5, each pixel within image 500 will have crop data therein and vegetation index data therein as generated by each vegetation index generating component in vegetation index generation component 114.

For example, pixels within crop of red peppers 502 will have crop data associated with a crop of red peppers and will have data created from each of NDVI generating component 708, an EVI generating component 710, a GNDVI generating component 712, a TNDVI generating component 714, an EVI2 generating component 716, an RVI generating component 718, a VARIgm generating component 720 and a SAVI generating component 722. Pixels within crop of red peppers 514 may have similar crop data as pixels within crop of red peppers 502. However, pixels within crop of red peppers 514 will have distinct data created from each of NDVI generating component 708, an EVI generating component 710, a GNDVI generating component 712, a TNDVI generating component 714, an EVI2 generating component 716, an RVI generating component 718, a VARIgm generating component 720 and a SAVI generating component 722.

Returning to FIG. 2, after an array of masked vegetation indices is generated (S210), an array of masked vegetation indices by boundary is generated (S212). For example, as shown in FIG. 1, vegetation index generation component 114 provides the array of vegetation indices to masking component 116 via communication channel 134.

In some embodiments boundaries may be country boundaries, state boundaries, county boundaries, town boundaries, city boundaries, individual plot boundaries, etc. . . . In some embodiments, boundaries may be crop boundaries. For example, as shown in FIG. 5, the boundaries may be the boundaries of crop of red peppers 502, crop of green beans 504, crop of corn 506, crop of broccoli 508, crop of green beans 510, crop of broccoli 512, crop of red peppers 514, crop of green beans 504, crop of corn 518, crop of broccoli 520, crop of corn 522 and crop of red peppers 524.

By generating array of masked vegetation indices by boundary, system efficiency may be improved by ignoring data associated with imaged land that is outside a boundary of interest. For example, as shown in FIG. 5, in one example a crop yield prediction may be desired for only the area if image 500 within the crop boundaries. In another example, a crop yield prediction may be desired for only a specific crop, e.g., crop of broccoli 512, wherein only the image data within the boundary of crop of broccoli 512 will be used.

Returning to FIG. 2, after a masked vegetation index by boundary is generated (S212), supplemental data is received (S214). For example, as shown in FIG. 1, accessing component 110 provides the weather data to predictive component 120 via communication channel 132, provides the historical crop yield data to predictive component 120 via communication channel 134 and provides the demographic/economic/regional data to predictive component 120 via communication channel 136.

For example, as shown in FIG. 1 accessing component 110 weather data, historical crop yield data and demographic/economic/regional data from database 106. As shown in FIG. 3, database 106 provides the weather data from weather data database 312, provides the demographic/economic/regional data from demographic/economic/regional data database 308 and provides the historical crop yield data from historical crop yield data database 310.

As shown in FIG. 4, communication component 402 receives the weather data from weather data database 312 and provides the weather data to weather data receiving component 408 via communication channel 418. Weather data may be useful in predicting crop yield in the sense that there may be a relationship between weather and crop yield, e.g., a particular range of rainfall may be associated with a particular crop yield and a particular range of temperatures may be associated with a particular crop yield.

Communication component 402 receives the demographic/economic/regional data from demographic/economic/regional data database 308 and provides the demographic/economic/regional data to demographic/economic/regional data receiving component 412 via communication channel 422. Demographic/economic/regional data may be useful in predicting crop yield in the sense that there may be a relationship between demographic/economic/regional data and crop yield, e.g., a particular median population income may be associated with a particular crop yield and a particular range of population may be associated with a particular crop yield.

Communication component 402 receives the historical crop yield data from historical crop yield data database 310 and provides the historical crop yield data to historical crop yield data receiving component 410 via communication channel 420. Historical crop yield data may be useful in predicting crop yield in the sense that there may be a relationship between historical crop yield data and crop yield, e.g., a crop yield in a specific month in previous years may be associated with a crop yield in the same month in the current year.

Returning to FIG. 1, weather data receiving component 408 (of accessing component 110) provides the weather data to predictive component 120 via communication channel 132. Historical crop yield data receiving component 410 (of accessing component 110) provides the historical crop yield data to predictive component 120 via communication channel 134. Demographic/economic/regional data receiving component 412 (of accessing component 110) provides the demographic/economic/regional data to predictive component 120 via communication channel 136.

Returning to FIG. 2, after the supplemental data is received (S214), a crop yield is predicted (S216). For example, as shown in FIG. 1, predictive component 120 generates a crop yield prediction based on the array of vegetation indices by boundary as provided by zonal statistics component 118 via communication channel 140, based on the weather data as provided by accessing component 110 via communication channel 132, based on the historical crop yield data as provided by accessing component 110 via communication channel 134 and based on the demographic/economic/regional data as provided by accessing component 110 via communication channel 136. This will be further discussed with reference to FIG. 8A.

FIGS. 8A-D illustrate graphs of an example set of crop predictions in accordance with aspects of the present invention.

FIG. 8A includes a graph 800 having a Y-axis 802 and an X-Axis 804. Y-axis 802 is the crop amount, measured in tons, and X-Axis 804 is time, measured in months.

A star 806 corresponds to the amount of broccoli yielded from crop of broccoli 508 at time $t_1$. A dot 808 corresponds to the amount of broccoli, predicted after time $t_1$ and before time $t_2$, that is predicted to be yielded from crop of broccoli 508 at time $t_2$.

Returning to FIG. 1, predictive component 120 uses the array vegetation indices by boundary from zonal statistics component 118, the weather data, the historical crop yield data and the demographic/economic/regional data from accessing component 110 and generates a predicted crop yield. In particular, each pixel will have a weighting factor for each of the vegetation indexes in the array of vegetation indices by boundary. Further, the weather data will have a predetermined weighting factor, the historical crop yield data will have a predetermined weighting factor and the demographic/economic/regional data will have a predetermined weighting factor.

The weighting factors for each of the vegetation indices and for the weather data, the historical crop yield data and the demographic/economic/regional data may be set in any known manner. The initial weighting factors settings are not particularly important as will be discussed later. In any event, returning to FIG. 8A, the weighting factors are using in conjunction with the provided data to generate a crop yield prediction at time $t_2$, as shown by dot 808. The first prediction is after time $t_1$, such that the historical crop yield data from the actual crop yield as shown by star 806 may be used.

Returning to FIG. 2, after the crop prediction is generated (S216), it is determined whether the generated crop prediction is the first crop prediction (S218).

If the crop prediction is the first crop prediction (Y at S218), then image data is received (S204) at a later time in a manner as discussed above. The array of vegetation indices is generated (S206), the crap data is received (S208), the array of masked vegetation indices is generated (S210), the array of masked vegetation indices by boundary is generated (S212) and the supplemental data is received (S214), all as discussed above.

A new crop prediction is then generated (S216) in a manner as discussed above. This new crop prediction will be described with reference to FIG. 8B.

FIG. 8B includes graph 800 with the addition of a star 810 and a dot 812.

Star 810 corresponds to the amount of broccoli yielded from crop of broccoli 508 at time $t_2$. Dot 812 corresponds to the amount of broccoli, predicted after time $t_2$ and before time $t_3$, that is predicted to be yielded from crop of broccoli 508 at time $t_3$.

Returning to FIG. 1, predictive component 120 uses the array vegetation indices by boundary from zonal statistics component 118, the weather data, the historical crop yield data and the demographic/economic/regional data from accessing component 110 and generates a predicted crop yield. In this case however, the historical crop yield data will include the actual crop yield associated with star 806 at time $t_1$ and the actual crop yield associated with star 810 at time $t_2$.

Returning to FIG. 2, after the crop prediction is generated (S216), it is determined whether the generated crop prediction is the first crop prediction (S218). In this example, it will then be determined that the generated crop prediction is not the first crop prediction (N at S218).

Multivariate regression is then performed (S220). For example, as shown in FIG. 1, regression component 122 receives the array vegetation indices by boundary, the weather data, the historical crop yield data and the demographic/economic/regional data, and predicted crop yields from predictive component 120 and modifies the weighting factors to generate a more accurate prediction. This will be described in greater detail with reference to FIGS. 8C-13.

First, there should be a discussion as to what would likely happen without a multivariate regression. This will be discussed with reference to FIGS. 8C-9.

FIG. 8C includes graph 800 with the addition a star 814.

Star 814 corresponds to the amount of broccoli yielded from crop of broccoli 508 at time $t_3$.

Figure 8D:
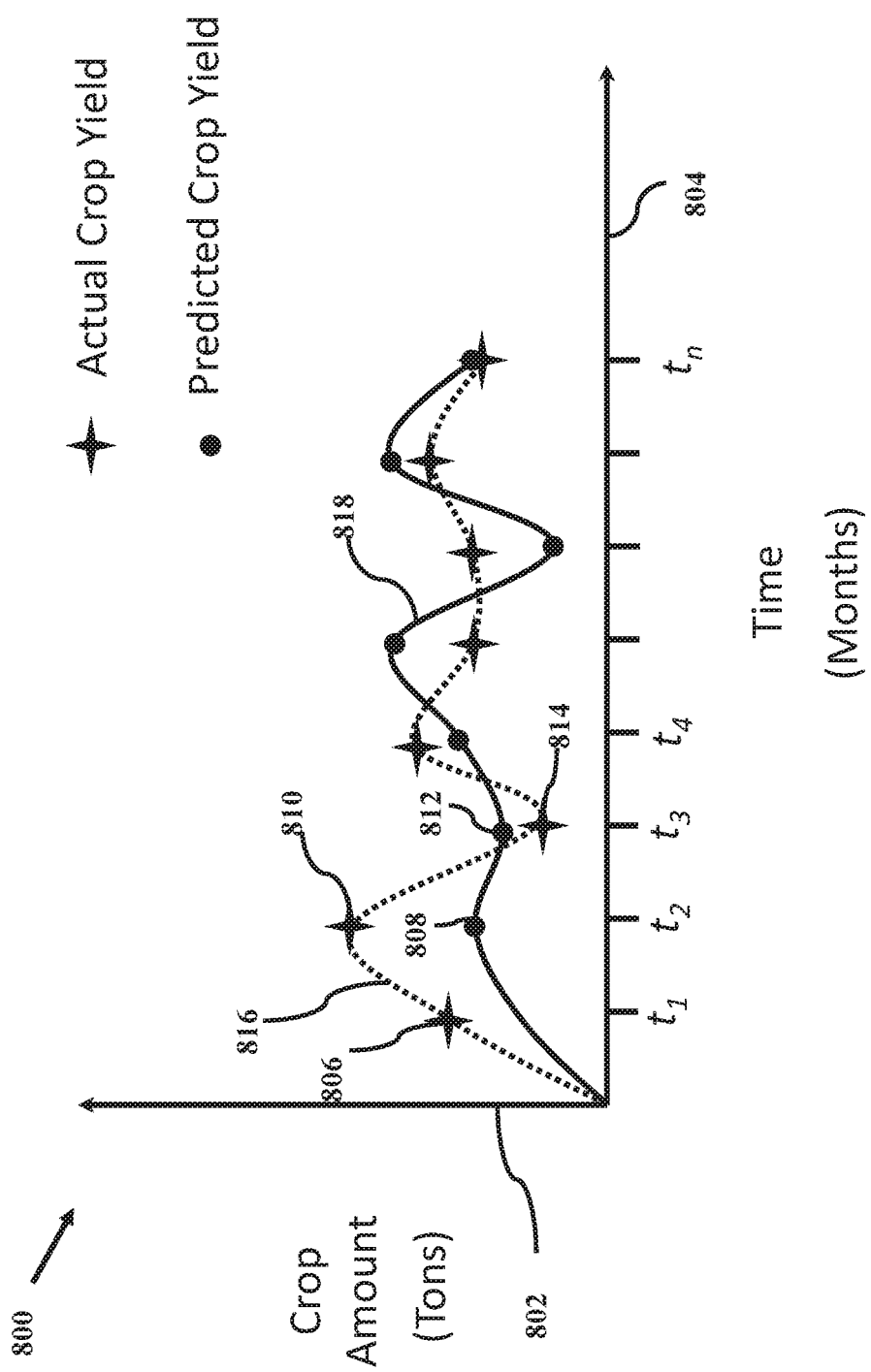
FIG. 8D illustrates a graph of actual crop yield versus predicted crop yield.

In this example, the weighting factors for each of the vegetation indices and for the weather data, the historical crop yield data and the demographic/economic/regional data are set and are fixed. As shown in FIG. 8C, the resulting predicted crop yield shown at dot 808 differs greatly from the actual crop yield shown at star 810. However, the resulting predicted crop yield shown at dot 812 differs at a lesser amount from the actual crop yield shown at star 812. On its face, it seems that the predictions are becoming more accurate over time. This is not the case is this example, as will be shown in FIG. 8D.

FIG. 8D includes graph 800 with the addition of additional stars, additional dots, a dotted-line 816 and a line 818.

The additional stars correspond to the amount of broccoli yielded from crop of broccoli 508 at additional times. The additional dots correspond to the respective amounts of broccoli that re predicted to be yielded from crop of broccoli the additional times. Dotted-line 816 shows a function of the actual crop yield of broccoli 508 by connecting the stars. Line 818 shows a function of the predicted crop yield of broccoli 508 by connecting the dots.

It is clear in the figure that the crop yield predictions, as shown by line 818 do not track the actual crop yields, as shown by line 816, very well. This is due to the fixed weighting factors for each of the vegetation indices and for the weather data, the historical crop yield data and the demographic/economic/regional data. By choosing or setting different fixed weighting factors will not solve the problem. This will be described with reference to FIG. 9.

Figure 9:
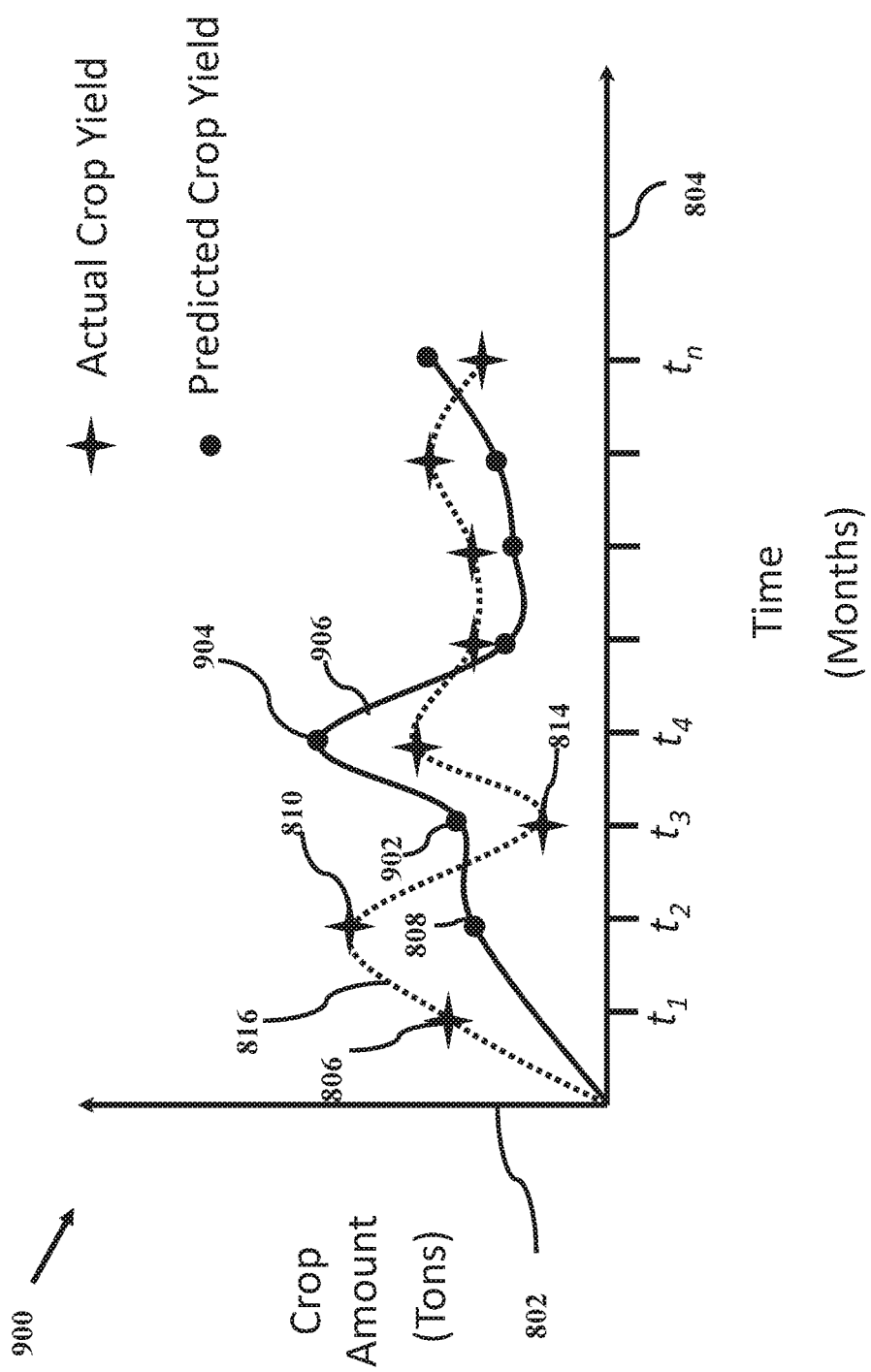
FIG. 9 illustrates another graph of actual crop yield versus predicted crop yield.

FIG. 9 illustrates a graph of another example set of crop predictions in accordance with aspects of the present invention.

FIG. 9 includes a graph 900 having Y-axis 802 and X-Axis 804. Graph 900 additionally includes dot 808, stars 806, 810, 814, the remaining stars along dotted-line 816, a dot 902, a dot 904, and additional dots along a line 906.

Dot 902 corresponds to the amount of broccoli, predicted after time $t_2$ and before time $t_3$, that is predicted to be yielded from crop of broccoli 508 at time $t_3$. Dot 904 corresponds to the amount of broccoli, predicted after time $t_3$ and before time $t_4$, that is predicted to be yielded from crop of broccoli 508 at time $t_4$. The additional dots correspond to the respective amounts of broccoli that are predicted to be yielded from crop of broccoli additional times. Line 906 shows a function of the predicted crop yield of broccoli 508 by connecting the dots.

It is clear in the figure that the crop yield predictions, as shown by line 906 do not track the actual crop yields, as shown by line 816, very well. Although the crop yield predictions in FIG. 9 are drastically different than the copy yield predictions in FIG. 8D, neither set of prediction is very accurate. This is due to the fixed weighting factors for each of the vegetation indices and for the weather data, the historical crop yield data and the demographic/economic/regional data. The multivariate regression aspect of the present invention addresses this issue. This will be described with reference to FIGS. 10-13.

Figure 10:
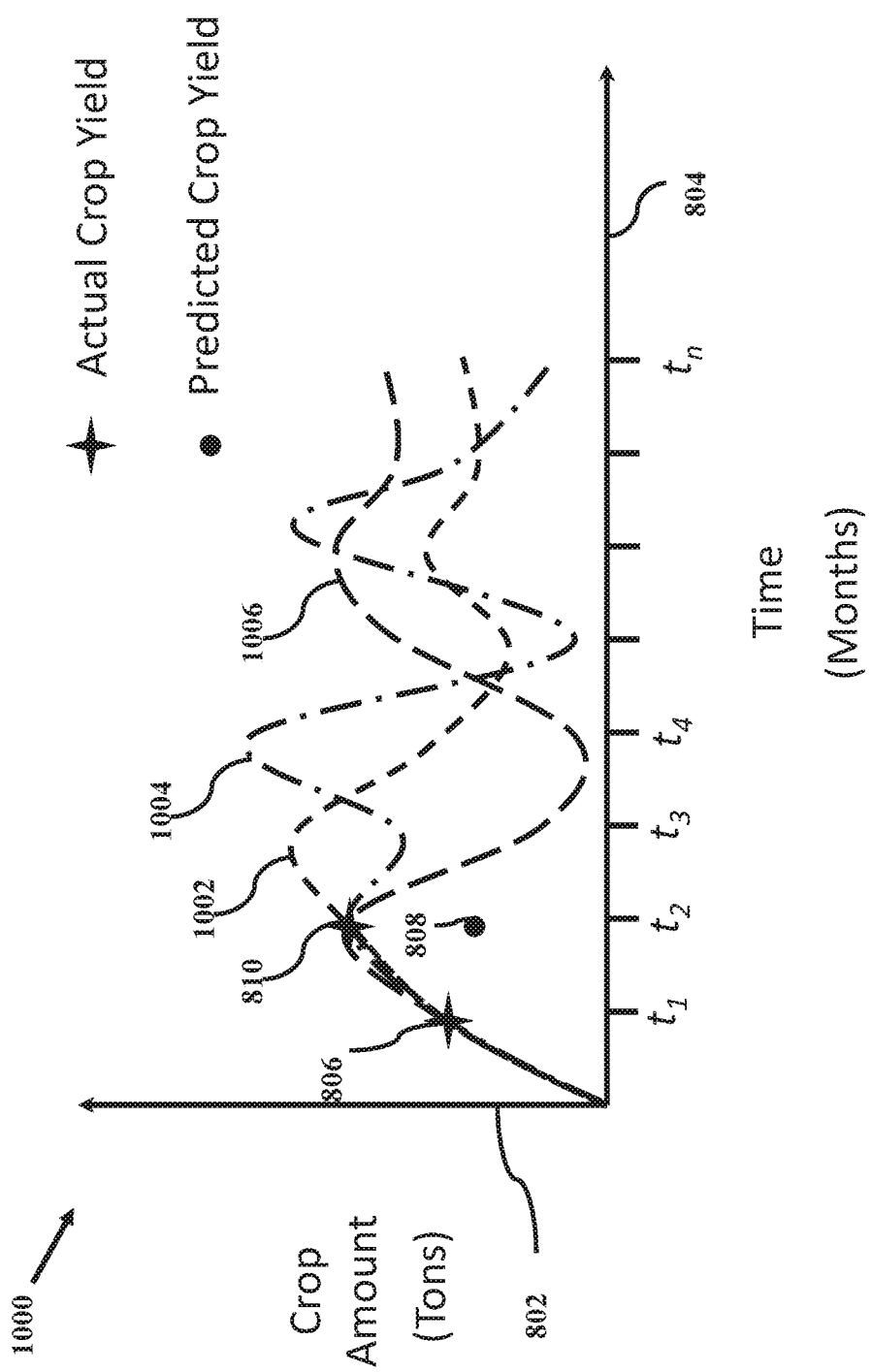
FIG. 10 illustrates another graph of actual crop yield versus predicted crop yield.

FIG. 10 illustrates a graph of another example set of crop predictions in accordance with aspects of the present invention.

FIG. 10 includes a graph 1000 having Y-axis 802 and X-Axis 804. Graph 1000 additionally includes dot 808, dot 812, stars 806 and 810, 814, a dashed line 1002, a dashed-dotted line 1004 and a dashed line 1006.

There are many functions for lines that pass through stars 806 and 810. A sample of such functions is illustrated as dashed line 1002, dashed-dotted line 1004 and dashed line 1006. Each function is created by modifying the many weighting factors for each of the vegetation indices and for the weather data, the historical crop yield data and the demographic/economic/regional data. Clearly, as the weighting factors are changed, there are drastically different prediction models for predicting the crop yield.

Returning to FIG. 1, in accordance with aspects of the present invention, regression component 122 modifies the weighting factors to arrive at a new prediction function. The manner of modification may be any known manner. However, the modification to the weighting factors is likely to occur again, as will be further described with reference to FIG. 11.

Figure 11:
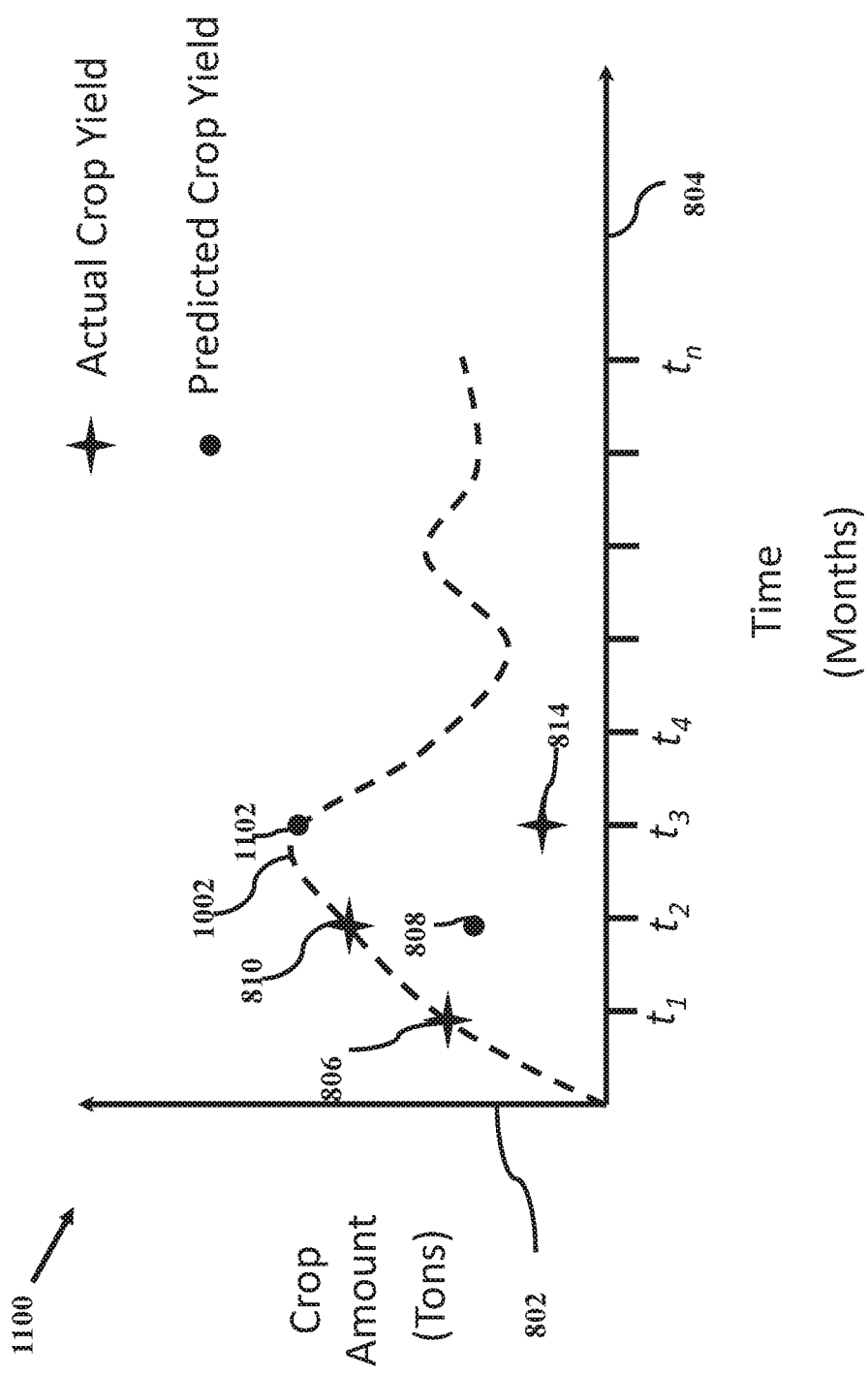
FIG. 11 illustrates another graph of actual crop yield versus predicted crop yield as predicted in accordance with aspects of the present invention

FIG. 11 illustrates a graph of another example crop prediction in accordance with aspects of the present invention.

FIG. 11 includes a graph 1100 having Y-axis 802 and X-Axis 804. Graph 1100 additionally includes dot 808, stars 806, 810, 814, dashed line 1002 and a dot 1102.

In this example, regression component 122 used dashed line 1002 to predict the crop yield. More particularly, regression component 122 modified the many weighting factors for each of the vegetation indices and for the weather data, the historical crop yield data and the demographic/economic/regional data such that the crop predictions would follow dashed line 1002. In this manner, the crop prediction at time $t_3$ would be at dot 1102 along dashed line 1002.

However, in this example, the actual crop yield at time $t_3$ is shown at star 814. Clearly, the weighting factors assigned by regression component 122 did not generate the correct crop predicting function. Returning to FIG. 2, method 200 continues as more and more estimates and actual crop yields are used (return to S204).

Returning to FIG. 1, with data provided for each actual crop yield, regression component 122 is able to update possible functions to predict future crop yield. This is shown in FIG. 12.

Figure 12:
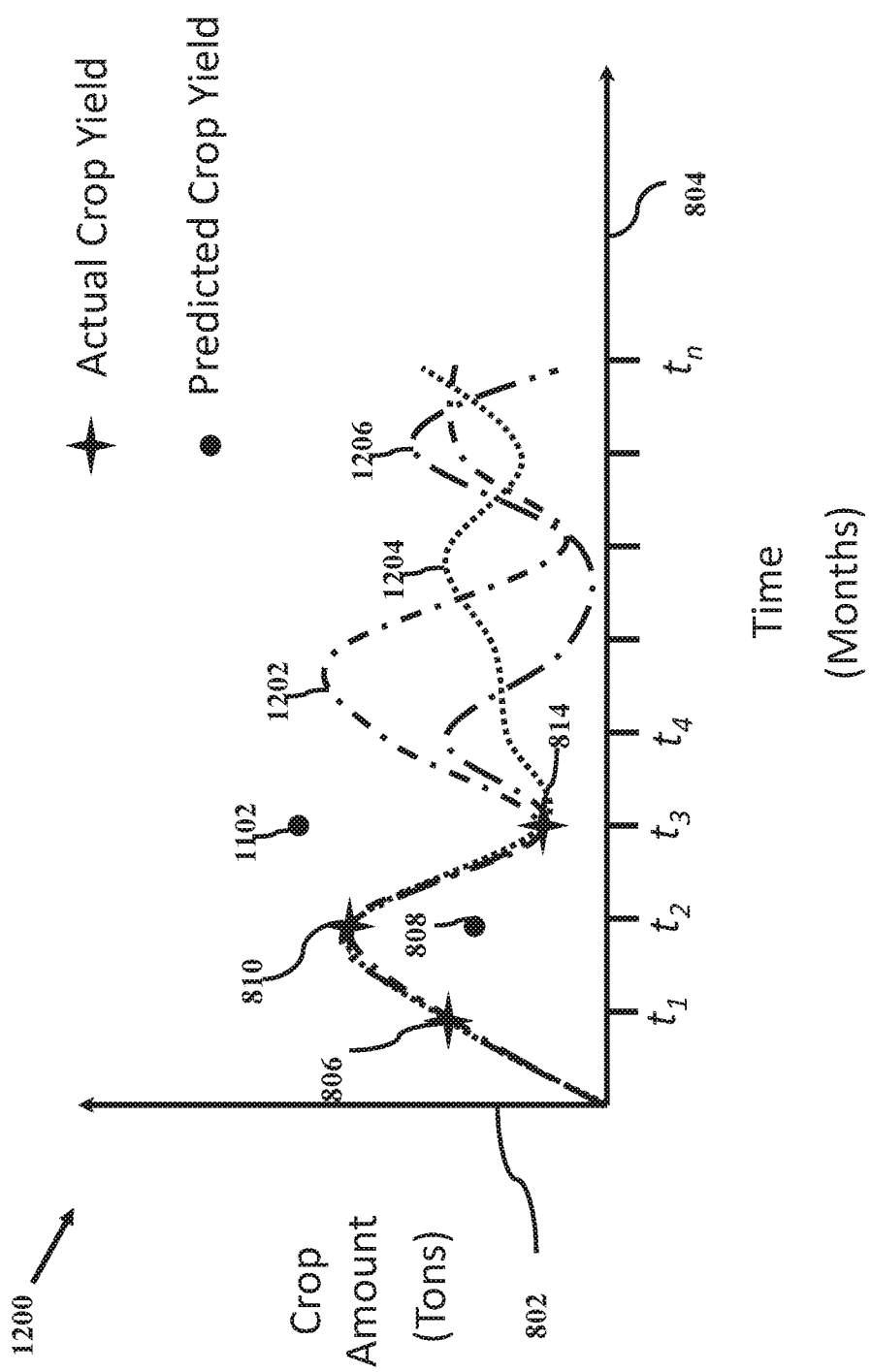
FIG. 12 illustrates another graph of actual crop yield versus predicted crop yield as predicted in accordance with aspects of the present invention.

FIG. 12 illustrates a graph of another example crop prediction in accordance with aspects of the present invention.

FIG. 12 includes a graph 1200 having Y-axis 802 and X-Axis 804. Graph 1200 additionally includes dot 808, dot 1102, stars 806, 810, 814, a dashed-dotted line 1202, a dotted line 1204 and a dashed-dotted line 1206.

Just as with FIG. 10 discussed above, there are many functions for lines that pass through stars 806, 810 and 814. A sample of such functions is illustrated dashed-dotted line 1202, dotted line 1204 and dashed-dotted line 1206. Again, each function is created by modifying the many weighting factors for each of the vegetation indices and for the weather data, the historical crop yield data and the demographic/economic/regional data. Clearly, as the weighting factors are changed, there are drastically different prediction models for predicting the crop yield.

This loop of predicting a crop yield based on modified weighting factors, receiving the actual yield and further modifying the weighting factors to provide an improved crop yield prediction continues. This will be shown with reference to FIG. 13.

Figure 13:
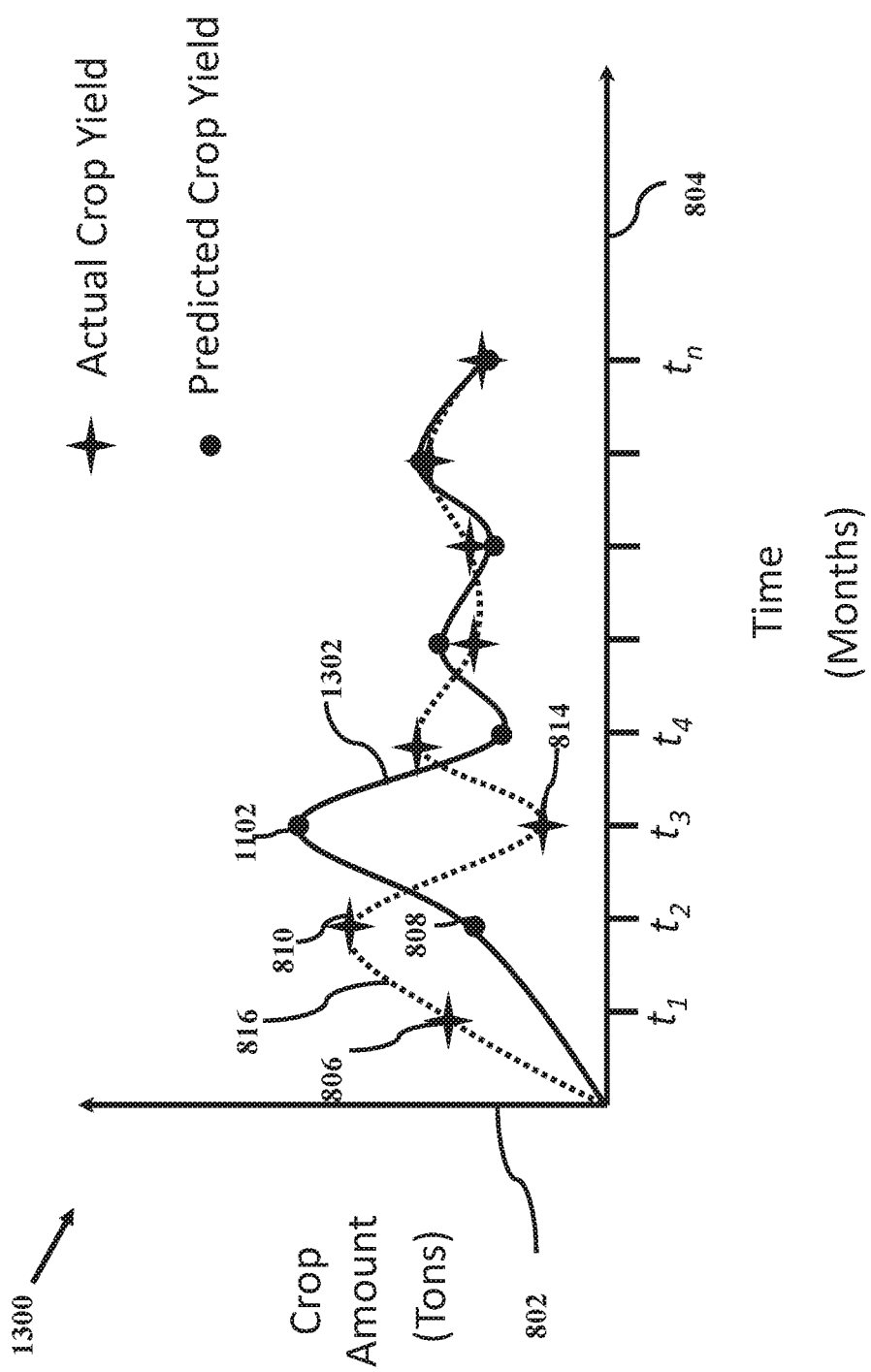
FIG. 13 illustrates another graph of actual crop yield versus predicted crop yield as predicted in accordance with aspects of the present invention.

FIG. 13 illustrates a graph of another example crop prediction in accordance with aspects of the present invention.

FIG. 13 includes a graph 1300 having Y-axis 802 and X-Axis 804. Graph 1300 additionally includes dot 808, dot 1102, stars 806, 810, 814, a plurality of additional stars connected by dotted line 816 and plurality of additional dots connected by a line a line 1302.

In the figure, line 1302 shows the history of crop predications, whereas dotted line 816 corresponds to the history of the actual crop yield. By comparing line 1302 with dotted line 816, it is clear that line 1302 starts to track dotted line 816 as time increases. In other words, in accordance with aspects of the present invention, a multivariate regression improves crop yield prediction as time increases.

In accordance with aspects of the present invention, regression component 122 modifies weighting factors to improve crop predictions. For example, consider FIGS. 5 and 7. Suppose, for the purposes of discussion that NDVI generating component 708 historically provides a more accurate indication of a crop yield with respect to crop of red peppers 502 as compared to RVI generating component 718. In such a case, regression component many increase a weighting factor for a vegetation index as generated by NDVI generating component 708 with respect to crop of red peppers 502 and decrease a weighting factor for a vegetation index as generated by RVI generating component 718 with respect to crop of red peppers 502.

In accordance with aspects of the present invention, a system and method predicting crop yield is provided based on image data of the crops. A multivariate regression constantly improves the crop prediction based on actual previous crop yield.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method, comprising:
   receiving, with a computer, image data of a geographic region, the image data including pixels;
   generating, with the computer, an array of vegetation indices based on analyzing the received image data utilizing a plurality of vegetation index generating components, each operable to generate a respective individual vegetation index based on the received image data, wherein each vegetation index in the array of vegetation indices is associated with a respective weighting factor;
   receiving, with the computer, crop data comprising training data for classifying one or more of the pixels as a type of crop;
   generating, with the computer, a masked vegetation index based on the array of vegetation indices and the received crop data, such that the pixels are associated with vegetation index data from each vegetation index in the array of vegetation indices and such that the pixels are associated with a classification as a type of crop;
   receiving, with the computer, historical crop yield data; and
   generating, with the computer, utilizing multivariate regression, a predicted crop yield based on the masked vegetation index and the historical crop yield data, wherein the multivariate regression includes utilizing the weighting factors of the array of vegetation indices and includes modifying the weighting factors of the array of vegetation indices based on past accuracy of results of individual ones of the array of vegetation indices, such that accuracy of the predicted crop yield in relation to the historical crop yield data is increased.

2. The method of claim 1, wherein said generating, with the computer, an array of vegetation indices based on the received image data comprises generating the array of vegetation indices as an array of normalized difference vegetation indices.

3. The method of claim 1, wherein said receiving, with the computer, image data of the geographic region comprises receiving multiband image data of a geographic region as RGB and near infrared image data of the geographic region.

4. The method of claim 1, claim 1, further comprising:
   receiving, with the computer, demographic data,
   wherein said generating, with the computer, the predicted crop yield based on the masked vegetation index comprises generating the predicted crop yield additionally based on the demographic data.

5. The method of claim 1, claim 1, further comprising:
   receiving, with the computer, weather data,
   wherein said generating, with the computer, the predicted crop yield based on the masked vegetation index comprises generating the predicted crop yield additionally based on the weather data.

6. The method of claim 1, wherein the predicted crop yield is a first predicted crop yield and the historical crop yield data is first historical crop yield data, and further comprising generating, with the computer, a second predicted crop yield based on second historical crop data and the modified weighting factors of the array of vegetation indices.

7. The method of claim 1, further comprising:
   receiving, with the computer, zonal statistics data associated with the geographic region,
   wherein said generating, with the computer, the predicted crop yield comprises generating the predicted crop yield additionally based on the zonal statistics data.

8. The method of claim 1, wherein said generating, with the computer, the predicted crop yield is further based on one or more of the following: weather data, demographic data, and zonal statistics data.

9. The method of claim 1, wherein the predicted crop yield is a first predicted crop yield, and further comprising:
   generating, with the computer, a second predicted crop yield based on the first predicted crop yield and the modified weighting factors of the array of vegetation indices.

10. The method of claim 9, wherein generating the second predicted crop yield is further based on one or more of the following: weather data, demographic data, and zonal statistics data.

11. A non-transitory, tangible, computer-readable media having computer-readable instructions stored thereon, for use with a computer, that when executed by the computer, cause the computer to:
   receive image data of a geographic region, the image data including pixels;
   generate an array of vegetation indices based on the received image data utilizing a plurality of vegetation index generating components, each operable to generate a respective individual vegetation index based on the received image data, wherein each vegetation index in the array of vegetation indices is associated with a respective weighting factor;
   receive crop data comprising training data for classifying one or more of the pixels as a type of crop;
   generate a masked vegetation index based on the array of vegetation indices and the received crop data, such that the pixels are associated with vegetation index data from each vegetation index in the array of vegetation indices and such that the pixels are associated with a classification as a type of crop;
   receive historical crop yield data; and
   generate, utilizing multivariate regression, a first predicted crop yield based on the masked vegetation index, and a second predicted crop yield based on the historical crop yield data, wherein the multivariate regression includes utilizing the weighting factors of the array of vegetation indices and includes modifying the weighting factors of the array of vegetation indices based on past accuracy of results of individual ones of the array of vegetation indices, such that accuracy of the second predicted crop yield in relation to the historical crop yield data is increased.

12. The non-transitory, tangible, computer-readable media of claim 11, wherein the computer-readable instructions that when executed by the computer, cause the computer to generate the array of vegetation indices based on the received image data further cause the computer to generate the array of vegetation indices as an array of normalized difference vegetation indices.

13. The non-transitory, tangible, computer-readable media of claim 11,
wherein to generate the second predicted crop yield comprises generating the second predicted crop yield based further on one or more of the following: weather data, demographic data, zonal statistics data, and demographic data.

14. The non-transitory, tangible, computer-readable media of claim 11, wherein the computer-readable instructions that when executed by the computer, cause the computer to generate the first predicted crop yield based on the masked vegetation index and one or more of the following: weather data, zonal statistics data, and demographic data.

\* \* \* \* \*

UNITED STATES PATENT AND TRADEMARK OFFICE
CERTIFICATE OF CORRECTION

PATENT NO. : 11,145,008 B2  
APPLICATION NO. : 16/900087  
DATED : October 12, 2021  
INVENTOR(S) : David Murr et al.

Page 1 of 1

It is certified that error appears in the above-identified patent and that said Letters Patent is hereby corrected as shown below:

In the Claims

Column 15, Line 64: After "claim 1," delete "claim 1,"

Column 16, Line 3: After "claim 1," delete "claim 1,"

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*